(12) United States Patent
Girt

(10) Patent No.: US 6,737,172 B1
(45) Date of Patent: May 18, 2004

(54) MULTI-LAYERED ANTI-FERROMAGNETICALLY COUPLED MAGNETIC MEDIA

(75) Inventor: Erol Girt, Berkeley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/005,913

(22) Filed: Dec. 7, 2001

Related U.S. Application Data

(60) Provisional application No. 60/254,237, filed on Dec. 7, 2000.

(51) Int. Cl.$^7$ ................................................ G11B 5/673
(52) U.S. Cl. .................. 428/611; 428/637; 428/668; 428/678; 428/686; 428/215; 428/336; 428/694 TM; 428/216
(58) Field of Search ................................. 428/611, 637, 428/668, 678, 686, 215, 336, 694 TM, 216

(56) References Cited

U.S. PATENT DOCUMENTS

| | | | |
|---|---|---|---|
| 5,408,377 A | | 4/1995 | Gurney et al. |
| 5,598,308 A | | 1/1997 | Dieny et al. |
| 5,815,342 A | * | 9/1998 | Akiyama et al. ......... 360/97.01 |
| 6,031,692 A | | 2/2000 | Kawawake et al. |
| 6,143,388 A | * | 11/2000 | Bian et al. ................. 428/65.3 |
| 6,146,776 A | * | 11/2000 | Fukuzawa et al. .......... 428/692 |
| 6,280,813 B1 | * | 8/2001 | Carey et al. ............... 428/65.3 |
| 6,372,330 B1 | * | 4/2002 | Do et al. .................... 428/212 |
| 6,391,430 B1 | * | 5/2002 | Fullerton et al. ........... 428/212 |
| 2002/0028357 A1 | * | 3/2002 | Shukh et al. ......... 428/694 TM |
| 2002/0034094 A1 | * | 3/2002 | Saito et al. ................. 365/158 |

* cited by examiner

Primary Examiner—Stevan A. Resan
Assistant Examiner—Kevin M. Bernatz
(74) Attorney, Agent, or Firm—McDermott, Will & Emery

(57) ABSTRACT

An anti-ferromagnetically coupled ("AFC"), high areal density magnetic recording medium having improved thermal stability and signal-to-medium noise ratio ("SMNR"), comprising:

(a) a non-magnetic substrate having at least one surface; and (b) a ferromagnetic recording layer comprising a layer stack overlying the at least one surface, the layer stack comprising a plurality of vertically spaced-apart ferromagnetic layers, the ferromagnetic layers being spaced-apart by respective non-magnetic spacer layers providing anti-ferromagnetic coupling (AFC) therebetween, the total exchange energy acting upon each of the ferromagnetic layers of the layer stack in the remanent state and their effective magnetic energies adjusted to provide opposing alignment of the magnetic moments of adjacent ferromagnetic layers of the stack.

19 Claims, 2 Drawing Sheets

MULTI-LAYERED ANTI-FERROMAGNETICALLY COUPLED MAGNETIC MEDIA

CROSS-REFERENCE TO PROVISIONAL APPLICATION

This application claims priority from U.S. provisional patent application Serial No. 60/254,237 filed Dec. 7, 2000, the entire disclosure of which is incorporated herein by reference.

FIELD OF THE INVENTION

The present invention relates to very high areal density magnetic recording media exhibiting improved thermal stability, such as hard disks. More particularly, the present invention relates to improved longitudinal magnetic recording media including a plurality of spacer layers providing enhanced anti-ferromagnetic coupling ("AFC") between a plurality of vertically spaced-apart ferromagnetic layers.

BACKGROUND OF THE INVENTION

Magnetic recording ("MR") media and devices incorporating same are widely employed in various applications, particularly in the computer industry for data/information storage and retrieval applications, typically in disk form. Conventional thin-film type magnetic media, wherein a fine-grained polycrystalline magnetic alloy layer serves as the active recording layer, are generally classified as "longitudinal" or "perpendicular", depending upon the orientation of the magnetic domains of the grains of magnetic material.

A portion of a conventional longitudinal recording, thin-film, hard disk-type magnetic recording medium 1 commonly employed in computer-related applications is schematically illustrated in FIG. 1 in simplified cross-sectional view, and comprises a substantially rigid, non-magnetic metal substrate 10, typically of aluminum (Al) or an aluminum-based alloy, such as an aluminum-magnesium (Al—Mg) alloy, having sequentially deposited or otherwise formed on a surface 10A thereof a plating layer 11, such as of amorphous nickel-phosphorus (Ni—P); a seed layer 12A of an amorphous or fine-grained material, e.g., a nickel-aluminum (Ni—Al) or chromium-titanium (Cr—Ti) alloy; a polycrystalline underlayer 12B, typically of Cr or a Cr-based alloy; a magnetic recording layer 13, e.g., of a cobalt (Co)-based alloy with one or more of platinum (Pt), Cr, boron (B), etc.; a protective overcoat layer 14, typically containing carbon (C), e.g., diamond-like carbon ("DLC"); and a lubricant topcoat layer 15, e.g., of a perfluoropolyether. Each of layers 11–14 may be deposited by suitable physical vapor deposition ("PVD") techniques, such as sputtering, and layer 15 is typically deposited by dipping or spraying.

In operation of medium 1, the magnetic layer 13 is locally magnetized by a write transducer, or write "head", to record and thereby store data/information therein. The write transducer or head creates a highly concentrated magnetic field which alternates direction based on the bits of information to be stored. When the local magnetic field produced by the write transducer is greater than the coercivity of the material of the recording medium layer 13, the grains of the polycrystalline material at that location are magnetized. The grains retain their magnetization after the magnetic field applied thereto by the write transducer is removed. The direction of the magnetization matches the direction of the applied magnetic field. The magnetization of the recording medium layer 13 can subsequently produce an electrical response in a read transducer, or read "head", allowing the stored information to be read.

Efforts are continually being made with the aim of increasing the areal recording density, i.e., the bit density, or bits/unit area, and signal-to-medium noise ratio ("SMNR") of the magnetic media. However, severe difficulties are encountered when the bit density of longitudinal media is increased above about 20–50 Gb/in$^2$ in order to form ultra-high recording density media, such as thermal instability, when the necessary reduction in grain size exceeds the superparamagnetic limit. Such thermal instability can, inter alia, cause undesirable decay of the output signal of hard disk drives, and in extreme instances, result in total data loss and collapse of the magnetic bits.

One proposed solution to the problem of thermal instability arising from the very small grain sizes associated with ultra-high recording density magnetic recording media, including that presented by the superparamagnetic limit, is to increase the crystalline anisotropy, thus the squareness of the magnetic bits, in order to compensate for the smaller grain sizes. However, this approach is limited by the field provided by the writing head.

Another proposed solution to the problem of thermal instability of very fine-grained magnetic recording media is to provide stabilization via coupling of the ferromagnetic recording layer with another ferromagnetic layer or an anti-ferromagnetic layer. In this regard, it has been recently proposed (E. N. Abarra et al., IEEE Conference on Magnetics, Toronto, April 2000) to provide a stabilized magnetic recording medium comprised of at least a pair of ferromagnetic layers which are anti-ferromagnetically-coupled ("AFC") by means of an interposed thin, non-magnetic spacer layer. The coupling is presumed to increase the effective volume of each of the magnetic grains, thereby increasing their stability.

The strength of coupling can be described in terms of the total exchange energy. For a pair of ferromagnetic layers separated by a non-magnetic spacer layer, the total exchange energy generally results from RKKY-type interaction (i.e., oscillation from anti-ferromagnetic to ferromagnetic with increasing spacer film thickness), dipole-dipole interactions between grains of the ferromagnetic layers across the spacer layer (which favors anti-ferromagnetic alignment of adjacent grains across the spacer layer), and exchange interaction (which favors ferromagnetic alignment of the ferromagnetic layers). In AFC media the thickness of the spacer layer is chosen to maximize anti-ferromagnetic coupling between the ferromagnetic layers, i.e., to maximize the RKKY-type anti-ferromagnetic coupling and the dipole-dipole interactions. According to this approach, the total exchange energy between the ferromagnetic layer pairs is a key parameter in determining the increase in stability.

In general, the ferromagnetic recording layer in longitudinal recording media is comprised of weakly coupled single-domain grains. The magnetic energy of each single-domain grain in the absence of an applied field (i.e., zero applied field) is identical to KV, where K is the anisotropy constant and V is the volume of the grain. Due to the interactions between grains in the recording layer (i.e., primarily direct exchange and dipole-dipole interactions), the magnetic energy of the grains in the recording layer is modified, i.e., changed to an effective magnetic energy, $E_{Meff}$.

In the simplest case, AFC media consist of two recording layers, i.e., a "main" layer (hereinafter layer "1"), and a "stabilization" layer (hereinafter layer "2"), which layers are anti-ferromagnetically coupled (AFC) across a thin, non-magnetic spacer layer. In general, the grains of the main and stabilization layers grow one above the other. Thus, an AFC grain may be defined as two adjacent grains grown one above the other, one grain being from the stabilization layer and one grain being from the stabilization layer, the two grains being anti-ferromagnetically coupled (AFC) across a non-magnetic spacer layer. During information storage in the media, the so-called "remanent state" of the media (wherein the external magnetic field is zero) is such that the magnetizations of the main (1) and stabilization (2) layers oppose each other, i.e., the magnetic moments of the pair of grains comprising each AFC grain (i.e., one grain being from the main layer and one grain being from the stabilization layer) are anti-parallel. If the external magnetic field is sufficiently large, the media is in a so-called "saturation state" and the magnetizations of the main (1) and stabilization (2) layers are parallel. In AFC media, in the absence of an external magnetic field, the total exchange energy favors the anti-ferromagnetic coupling (AFC) and is large enough such that the stabilization layer (2) can overcome the effective energy barrier and "flip" from the "saturation state" to a state in which its magnetic moment is anti-parallel to the magnetic moment of the main layer (1) within the time scale (i.e., interval) of interest.

A simplified explanation of the above effect is as follows: assume that the AFC media consists of AFC grains that do not interact with each other, i.e., interactions between grains within each of the main (1) and stabilization (2) layers are negligible in comparison with the interactions between adjacent grains in the main (1) and stabilization (2) layers across the spacer layer that are grown one above the other. The energy barriers of the magnetic grains in AFC media are modified due to the total exchange interaction. In the AFC grain, the total exchange interaction should reduce the energy barrier that the magnetic moment of the grain of the stabilization layer (2) must overcome in order to "flip" within the time scale of interest (i.e., interval) from the "saturation state" to the state in which it opposes the magnetic moment of the grain of the main layer (1). In the literature, the expression "exchange field" is frequently employed in place of the expression "total exchange energy" in order to describe the strength of the anti-ferromagnetic (AFC) coupling. For an isolated AFC grain, the exchange field, $H_{ex2}$, that the grains of the stabilization layer (2) experience due to the coupling with the grain from the main layer (1) must be greater than the coercivity of the grains of the stabilization layer (2) if the magnetic moments of the grains are to be aligned anti-parallel. As mentioned, the exchange field, $H_{ex2}$, arises mainly due to RKKY-type interaction between the main (1) and stabilization (2) layers across the thin spacer layer and therefore is: $H_{ex2}=J/M_{s2}t_2$, where $M_{s2}$ and $t_2$, respectively, are the saturation magnetization and thickness of the grain of the stabilization layer (2) and J is the interface exchange energy density across the spacer layer. In some instances, the dipole-dipole interaction (and in rare instances only, the direct exchange interaction) between magnetic grains in the main (1) and stabilization (2) layers must also be taken into account in calculating $H_{ex2}$. The effective magnetic energy $(KV_{eff})$ of the AFC grain depends on the total exchange energy and is between the effective magnetic energy $(KV)_{1eff}$ of the grain in the main layer (1) that occurs if the total exchange energy is so weak that it can be neglected and the sum of the effective magnetic energies $(KV)_{1eff}+(KV)_{2eff}$ of the grains in the main (1) and stabilization (2) layers that can be achieved for total exchange energies larger than $2(KV)_1(KV)_2/(KV)_1+(KV)_2$ [H. J. Richter and E. Girt, to be submitted to *Appl Phys. Lett.*].

For multi-layer AFC-type media, i.e., with three or more anti-ferromagnetically coupled ferromagnetic layers, the total exchange energy acting upon a given ferromagnetic layer can be determined by taking into account all interactions between the given ferromagnetic layer and adjacent ferromagnetic layers (depending upon the position of a particular ferromagnetic layer in a multi-layer stack, the number of adjacent ferromagnetic layers is one or two).

However, a significant drawback associated with the above approach is observed when a pair of ferromagnetic layers of alloy compositions which exhibit superior performance when utilized in conventional longitudinal magnetic recording media, e.g., Co—Cr and Co—Cr—Pt alloys, are coupled across an interposed thin, non-magnetic spacer layer. Specifically, the interface exchange energy density, J, is, in general, significantly lower than that observed with layers composed of pure (i.e., unalloyed) Co. In such instances, enhancement of the interface exchange energy density J between a pair of vertically spaced-apart ferromagnetic layers, hence increased thermal stability, may be obtained by interposition of a magnetic coupling structure between the pair of vertically spaced-apart ferromagnetic layers, comprised of a thin non-magnetic spacer layer and at least one thin ferromagnetic interface layer of selected thickness at at least one interface between the pair of ferromagnetic layers and the non-magnetic spacer layer.

Notwithstanding the obtainment of the improved interface exchange energy density J provided by the above-described spacer/interface layer approach, the continuously increasing requirements for high storage density magnetic media exhibiting high SMNR with good thermal stability necessitate an even further increase in the magnetic signal of such media without incurring a concomitant increase in thickness of the ferromagnetic layer(s) of the media.

Accordingly, there exists a need for improved methodology for providing thermally stable, high areal density magnetic recording media, e.g., longitudinal media, with increased total exchange energy, in particular, interface exchange energy density J between pairs of very thin ferromagnetic layers (i.e., much thinner than in conventional magnetic media) separated by a non-magnetic spacer layer (such as of a Ru-based material), wherein each of the very thin ferromagnetic layers is formed of a ferromagnetic alloy composition similar to compositions conventionally employed in fabricating longitudinal magnetic recording media, which methodology can be implemented at a manufacturing cost compatible with that of conventional manufacturing technologies for forming high areal density magnetic recording media. There also exists a need for improved, high areal density magnetic recording media, e.g., in disk form, which media include a plurality of very thin, anti-ferromagnetically coupled ferromagnetic alloy layers separated by a non-magnetic spacer layer, or a combination of a non-magnetic spacer layer and at least one interface layer, wherein each of the very thin ferromagnetic layers is formed of a ferromagnetic alloy composition similar to compositions conventionally utilized in longitudinal magnetic recording media (such as Co-based alloys) and the anti-ferromagnetic coupling between the ferromagnetic layers is enhanced, leading to improved thermal stability.

The present invention, therefore, addresses and solves problems attendant upon forming high areal recording density, thermally stable, high SMNR magnetic recording media, e.g., in the form of hard disks, which media utilize anti-ferromagnetic coupling between a plurality of vertically spaced-apart ferromagnetic layers for enhancing thermal stability, while providing full compatibility with all aspects of conventional automated manufacturing technology. Moreover, manufacture and implementation of the present invention can be obtained at a cost comparable to that of existing technology.

DISCLOSURE OF THE INVENTION

An advantage of the present invention is an improved, high areal recording density magnetic recording medium having increased thermal stability.

Another advantage of the present invention is an improved, high areal recording density, longitudinal magnetic recording medium having enhanced anti-ferromagnetic coupling between a plurality of vertically spaced-apart ferromagnetic layers.

Yet another advantage of the present invention is an improved method for fabricating thermally stable, high areal recording density magnetic recording media.

Still another advantage of the present invention is an improved method for fabricating thermally stable, high recording density magnetic recording media utilizing anti-ferromagnetic coupling between a plurality of vertically spaced-apart ferromagnetic layers.

Additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to one aspect of the present invention, the foregoing and other advantages are obtained in part by an anti-ferromagnetically coupled ("AFC"), high areal density magnetic recording medium having improved thermal stability and signal-to-medium noise ratio ("SMNR"), comprising:

(a) a non-magnetic substrate having at least one surface; and (b) a layer stack overlying the at least one surface, the layer stack comprising a plurality of vertically spaced-apart ferromagnetic layers, the ferromagnetic layers being spaced-apart by respective non-magnetic spacer layers providing anti-ferromagnetic coupling (AFC) therebetween, the total exchange energy acting upon each of the ferromagnetic layers of the layer stack in the remanent state and their effective magnetic energies adjusted to provide opposing alignment of the magnetic moments of adjacent ferromagnetic layers of the stack, wherein:

(i) the magnetic energy of every second ferromagnetic layer, starting from the topmost ferromagnetic layer of the stack, is greater than or equal to the magnetic energy of the respective intermediate ferromagnetic layer or layers, or the magnetic energy of every second ferromagnetic layer, starting from the topmost ferromagnetic layer of the stack, is less than or equal to the magnetic energy of the respective intermediate ferromagnetic layer or layers;

(ii) the effective magnetic energy of a majority of the magnetic grains of every second ferromagnetic layer of the stack, starting from the topmost ferromagnetic layer of the stack, is greater than or equal to the effective magnetic energy of the magnetic grains of the respective intermediate ferromagnetic layer or layers; and (iii) the magnetic remanence-thickness product ("$M_rt$") of every second ferromagnetic layer, starting from the topmost ferromagnetic layer of the stack, is greater than or equal to the $M_rt$ of the respective intermediate ferromagnetic layer or layers, or the $M_rt$ of every second ferromagnetic layer, starting from the second from the topmost ferromagnetic layer of the stack, is less than or equal to the $M_rt$ of the respective intermediate ferromagnetic layer or layers.

According to embodiments of the present invention, the layer stack comprises n spaced-apart ferromagnetic layers, where n is an even or odd integer ranging from 2 to about 30; each of the ferromagnetic layers is from about 4 (i.e., 2 monolayers) to about 200 Å thick and comprises a single ferromagnetic layer or a plurality of ferromagnetic sub-layers; the single ferromagnetic layer and each of the plurality of ferromagnetic sub-layers comprises at least one ferromagnetic alloy, e.g., at least one Co-based alloy with at least one element from the group consisting of Pt, Cr, B, Fe, Ta, Ni, Mo, V, Nb, W, Ru, and Ge; and each of the non-magnetic spacer layers is from about 2 to about 20 Å thick and comprises a material selected from the group consisting of Ru, Rh, Ir, Cr, Cu, and their alloys.

In accordance with other embodiments of the present invention, the magnetic recording medium may further comprise a ferromagnetic interface layer at at least one interface between the non-magnetic spacer layer(s) and the respective ferromagnetic layers for increasing RKKY-type coupling of the ferromagnetic layers across the non-magnetic spacer layer; e.g., the ferromagnetic interface layer(s) may comprise an about 1 monolayer thick to an about 40 Å thick layer of a ferromagnetic material having a saturation magnetization value $M_s$>600 emu/cc.

According to particular embodiments of the present invention, each of the ferromagnetic interface layers comprises an about 1 monolayer thick to an about 40 Å thick layer of at least one of Co and Fe or their alloys with at least one of Pt, Cr, B, Ni, Ru, and Ta, wherein the concentration(s) of the at least one of Co and Fe in the alloy is (are) constant or varies across the thickness of the interface layer from high near an interface with the non-magnetic spacer layer to low near an interface with a ferromagnetic layer.

In accordance with further embodiments of the present invention, the magnetic recording medium further comprises:

(c) seed and underlayers between the at least one surface of the non-magnetic substrate and the layer stack for controlling the crystallographic texture of the ferromagnetic layers; and (d) protective overcoat and lubricant topcoat layers provided on an upper surface of said layer stack.

According to particular embodiments of the present invention, the seed layer is from about 10 to about 1000 Å thick and comprises an amorphous or fine-grained material selected from the group consisting of Ni—Al, Fe—Al, Cr—Ti, Cr—Ta, Ta, Ta—W, Ru—Al, Co—Ti, and TaN; and the underlayer is from about 10 to about 300 Å thick and comprises a polycrystalline layer of Cr or a Cr-based alloy.

According to another aspect of the present invention, a method of forming a high areal density magnetic recording medium having improved thermal stability and signal-to-media noise ratio ("SMNR"), comprises steps of:

(a) providing a non-magnetic substrate having at least one surface adapted for layer formation thereover; and (b) forming a layer stack overlying the at least one surface, the layer stack comprising a plurality of vertically spaced-apart ferromagnetic layers, the ferromagnetic layers being spaced-apart by respective non-magnetic spacer layers providing anti-ferromagnetic coupling ("AFC") therebetween, the total exchange energy acting upon each of the ferromagnetic layers of the layer stack in the remanent state and their effective magnetic energies being adjusted to provide opposing alignment of the magnetic moments of adjacent ferromagnetic layers of the stack, wherein:

(i) the magnetic energy of every second ferromagnetic layer, starting from the topmost ferromagnetic layer of the stack, is greater than or equal to the magnetic energy of the respective intermediate ferromagnetic layer or layers, or the magnetic energy of every second ferromagnetic layer, starting from the topmost ferromagnetic layer of the stack, is less than or equal to the magnetic energy of the respective intermediate ferromagnetic layer or layers;

(ii) the effective magnetic energy of a majority of the magnetic grains of every second ferromagnetic layer of the stack, starting from the topmost ferromagnetic layer of the stack, is greater than or equal to the effective magnetic energy of the magnetic grains of the respective intermediate ferromagnetic layer or layers; and (iii) the magnetic remanence-thickness product ("$M_r t$") of every second ferromagnetic layer, starting from the topmost ferromagnetic layer of the stack, is greater than or equal to the $M_r t$ of the respective intermediate ferromagnetic layer or layers, or the $M_r t$ of every second ferromagnetic layer, starting from the second from the topmost ferromagnetic layer of the stack, is less than or equal to the $M_r t$ of the respective intermediate ferromagnetic layer or layers.

In accordance with embodiments of the present invention, step (b) comprises:

(1) forming the layer stack as including n spaced-apart ferromagnetic layers, where n is an even or odd integer ranging from 2 to about 30;

(2) forming the layer stack such that each of the ferromagnetic layers comprises at least one ferromagnetic alloy, is from about 4 (i.e., about 2 monolayers) to about 200 Å thick, and comprises a single ferromagnetic layer or a plurality of ferromagnetic sublayers, the at least one ferromagnetic alloy being selected from alloys of Co with at least one element selected from the group consisting of Pt, Cr, B, Fe, Ta, Ni, Mo, V, Nb, W, Ru, and Ge; and (3) forming the layer stack such that each of the non-magnetic spacer layers is from about 2 to about 20 Å thick and comprises a material selected from the group consisting of Ru, Rh, Ir, Cr, Cu, and their alloys.

According to further embodiments of the present invention, step (b) may comprise forming the layer stack such that a ferromagnetic interface layer is present at at least one interface between the non-magnetic spacer layers and the respective ferromagnetic layers for increasing RKKY-type coupling of the ferromagnetic layers across the non-magnetic spacer layers, each of the ferromagnetic interface layers comprising an about 1 monolayer thick to an about 40 Å thick layer of a ferromagnetic material having a saturation magnetization value $M_s > 600$ emu/cc, the ferromagnetic material being comprised of at least one of Co and Fe or their alloys with at least one of Pt, Cr, B, Ni, Ru, and Ta, wherein the concentration(s) of the at least one of Co and Fe in the alloy is (are) constant or varies across the thickness of the interface layer(s) from high near an interface with the non-magnetic spacer layer to low near an interface with a ferromagnetic layer.

In accordance with still further embodiments of the present invention, the method further comprises steps of:

(c) providing seed and underlayers between the at least one surface of the non-magnetic substrate and the layer stack for controlling the crystallographic texture of the ferromagnetic layers, the seed layer being from about 10 to about 1000 Å thick and comprising an amorphous or fine-grained material selected from the group consisting of Ni—Al, Fe—Al, Cr—Ti, Cr—Ta, Ta, Ta—W, Ru—Al, Co—Ti, and TaN; and the underlayer being from about 10 to about 300 Å thick and comprising a polycrystalline layer of Cr or a Cr-based alloy; and (d) forming protective overcoat and lubricant topcoat layers on an upper surface of the layer stack.

Still another aspect of the present invention is a high areal density magnetic recording medium having improved thermal stability and signal-to-medium noise ratio ("SMNR"), comprising:

a non-magnetic substrate having at least one surface; and a stacked multilayer magnetic means on the at least one surface for increasing thermal stability and SMNR of the medium.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein.

DESCRIPTION OF THE INVENTION

The present invention is based upon recognition that high areal density, thin-film magnetic recording media, e.g., longitudinal recording media, having improved thermal stability and signal-to-media noise ratio (SMNR), can be reliably and controllably manufactured by providing a stacked multilayer structure comprised of a plurality n of vertically spaced-apart, very thin ferromagnetic layers (where n is an even or odd integer ranging from about 2 to about 30), which layers are anti-ferromagnetic coupled ("AFC") together by means of a non-magnetic spacer layer (or a combination of a spacer and at least one thin, ferromagnetic interface layer) interposed between vertically adjacent ferromagnetic layers. According to the invention, the total exchange energy acting upon each of the plurality of vertically spaced-apart ferromagnetic layers in the remanent state and their effective magnetic energies are adjusted to provide opposing alignment of the magnetic moments of adjacent ferromagnetic layers of the stack; wherein (i) the magnetic energy of every second ferromagnetic layer, starting from the topmost ferromagnetic layer of the stack, is greater than or equal to the magnetic energy of the respective intermediate ferromagnetic layer or layers, or the magnetic energy of every second ferromagnetic layer, starting from the topmost ferromagnetic layer of the stack, is less than or equal to the magnetic energy of the respective intermediate ferromagnetic layer or layers; (ii) the effective magnetic energy of a majority of the magnetic grains of every second ferromagnetic layer, starting from the topmost ferromagnetic layer of the stack, is greater than or equal to the effective magnetic energy of the magnetic grains of the respective intermediate ferromagnetic layer or layers; and (iii) the magnetic remanence-thickness product ("$M_r t$") of every second ferromagnetic layer, starting from the topmost ferromagnetic layer of the stack, is greater than or equal to the $M_r t$ of the respective intermediate ferromagnetic layer or layers, or the $M_r t$ of every second ferromagnetic layer, starting from the second from the topmost ferromagnetic layer of the stack, is less than or equal to the $M_r t$ of the respective intermediate ferromagnetic layer or layers.

The inventive methodology affords several advantages not obtainable according to the conventional art, including, inter alia, increased thermal stability and SMNR of high areal recording density, longitudinal magnetic media without requiring an undesirable increase in media thickness; and reliable, controllable, and cost-effective formation of thermally stable, very high areal density magnetic recording media utilizing conventional manufacturing techniques and instrumentalities, e.g., sputtering techniques and apparatus.

Figure 1:
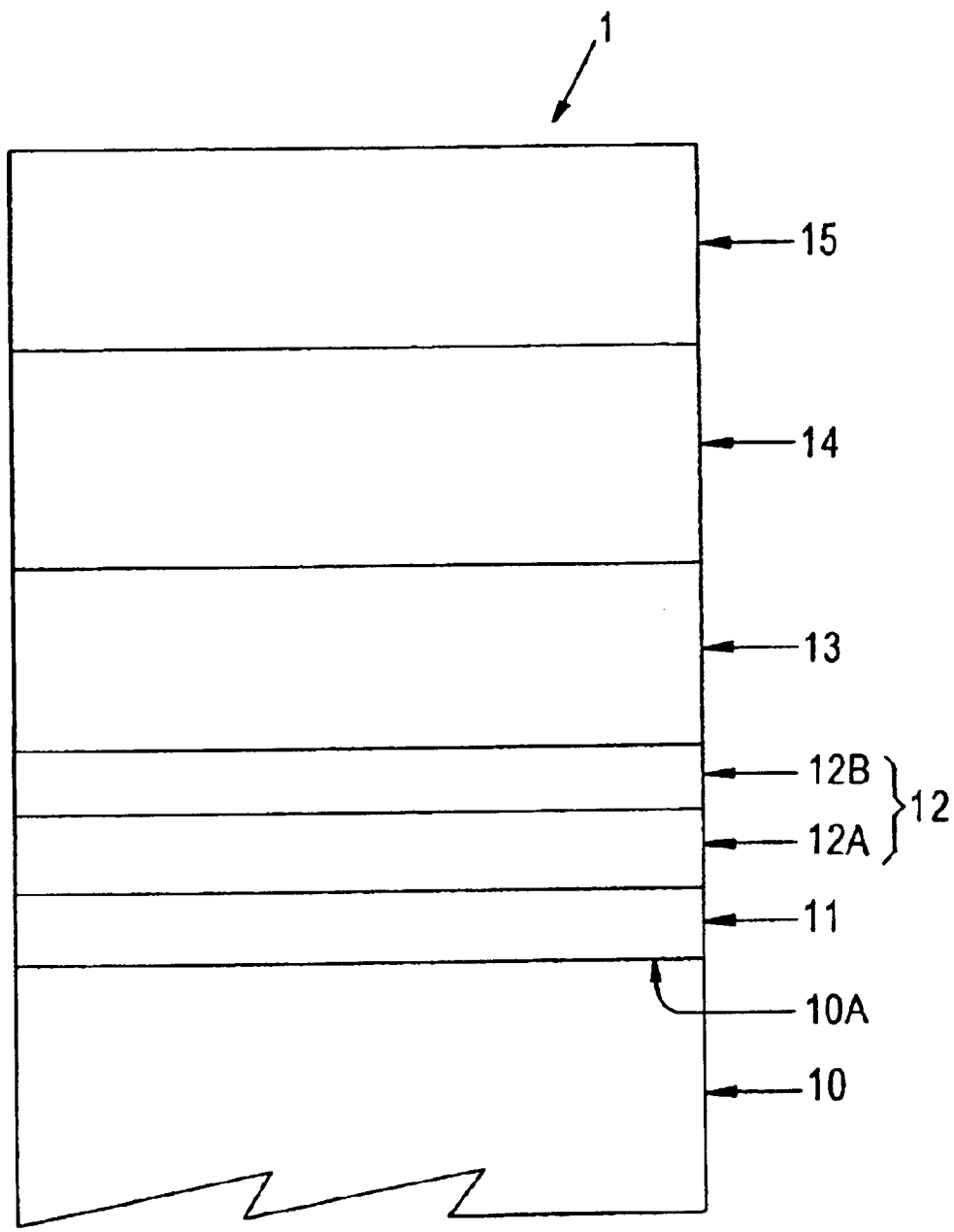
FIG. 1 schematically illustrates, in simplified cross-sectional view, a portion of a conventional thin-film, longitudinal-type magnetic disk recording medium.
Figure 2:
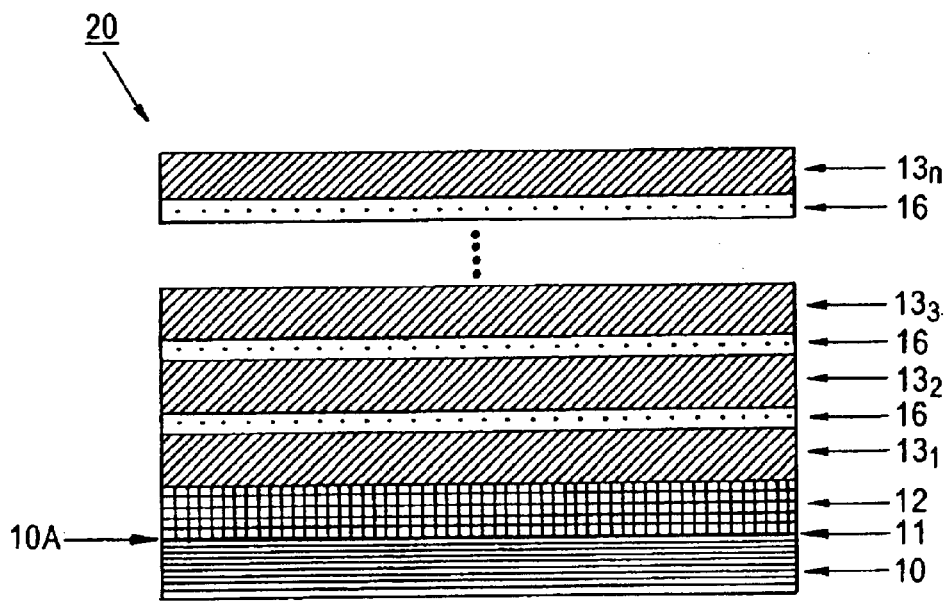
FIGS. 2–3 schematically illustrate, in simplified cross-sectional view, portions of embodiments of anti-ferromagnetically coupled (AFC) magnetic recording media according to the present invention.
Figure 3:
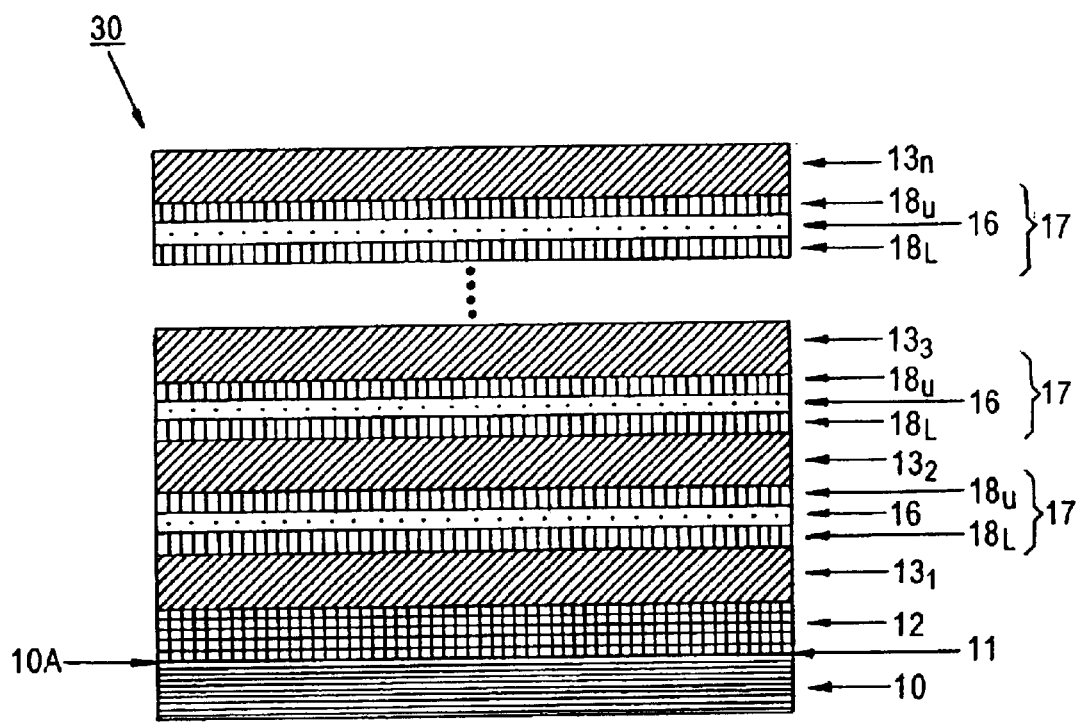

FIGS. 2–3 schematically illustrate, in simplified cross-sectional view, embodiments of magnetic recording media embodying the inventive concept. An embodiment of a magnetic recording medium 20 according to the invention is shown in FIG. 2 and includes a non-magnetic substrate 10 selected from among non-magnetic metals and alloys, Al, Al-based alloys such as Al—Mg alloys, NiP-plated Al ("Al/NiP"), glass, ceramics, polymers, and composites and laminates of the aforementioned materials. The thickness of substrate 10 is not critical; however, in the case of magnetic recording media for use in hard disk applications, substrate 10 must be of a thickness sufficient to provide the necessary rigidity. Substrate 10 typically comprises Al or an Al-based alloy, e.g., an Al—Mg alloy, and includes on the surface 10A thereof a plating layer 11, e.g., a layer of amorphous NiP. Formed on the plating layer 11 is an underlayer layer 12, for controlling the crystallographic texture and properties of ferromagnetic Co-based alloy layers deposited thereover, which underlayer 12 includes first, or lower, and second, or upper, portions 12A and 12B, respectively (as shown in FIG. 1), wherein the first, or lower portion 12A is a seed layer comprised of an amorphous or fine-grained material, e.g., a Ni—Al, Fe—Al, Cr—Ti, Cr—Fa, Ta, Ta—W, Ru—Al, Co—Ti, or TaN layer from about 10 to about 1,000 Å thick, and the second, or upper portion 12B is a polycrystalline underlayer, typically a Cr or Cr-based alloy layer (e.g., of Cr—W, Cr—Mo, CoCr, etc.) from about 10 to about 300 Å thick.

According to the invention, the single ferromagnetic layer 13 of the conventionally-structured magnetic recording medium 1 of FIG. 1 is replaced with a stacked multilayer structure comprising a plurality n (where n is an even or odd integer ranging from 2 to about 30) of vertically stacked, strongly anti-ferromagnetically coupled (AFC) ferromagnetic layers $13_1, 13_2, 13_3 \ldots 13_n$, wherein vertically adjacent ferromagnetic layers of the stack are spaced-apart by a respective thin, non-magnetic anti-ferromagnetic coupling (AFC) layer 16.

By way of illustration, but not limitation, according to the invention, each of the ferromagnetic layers $13_1, 13_2, 13_3, \ldots 13_n$ may comprise an about 4 (i.e., 2 monolayer) to about 200 Å thick crystalline layer (or a plurality of ferromagnetic sub-layers) of at least one alloy of Co with at least one of Pt, Cr, B, Fe, Ta, Ni, Mo, V, Nb, W, Ru, and Ge; each thin, crystalline, non-magnetic spacer layer 16 is selected to provide a large RKKY-type coupling effect, and comprises a material selected from the group consisting of Ru, Rh, Ir, Cr, Cu, and their alloys. By way of illustration, each spacer layer 16 may comprise Ru or a Ru-based alloy, such as a $Ru_{100-\delta}Cr_\delta$, alloy, where $\delta$=from about 5 to about 30, from about 2 to about 20 Å thick, preferably from about 6 to about 10 Å thick.

Each of the layers of the magnetic medium 20, including those of the spacer layer 16 of the present invention, may be deposited or otherwise formed by any suitable physical vapor deposition technique (PVD), e.g., sputtering, or by a combination of PVD techniques, i.e., sputtering, vacuum evaporation, etc. Protective overcoat and lubricant topcoat layers, respectively analogous to layers 14 and 15 shown in FIG. 1, are typically provided over the upper surface of the uppermost ferromagnetic layer $13_n$, in conventional fashion, e.g., as by sputtering and dipping, respectively, which layers 14 and 15 are not shown in FIGS. 2–3 in order not to unnecessarily obscure the key features of the invention.

The present invention also contemplates formation of another embodiment of a magnetic recording medium comprising a plurality of vertically spaced-apart, anti-ferromagnetically coupled ferromagnetic layers $13_1, 13_2, 13_3 \ldots 13_n$, wherein each of the vertically adjacent ferromagnetic layers may be constituted as described above with respect to FIG. 2, and separated by a spacer layer structure 17 comprising a crystalline, thin, non-magnetic spacer layer 16 wherein at least one thin, ferromagnetic interface layer $18_U$, $18_L$ may be present at at least one of the interfaces between vertically adjacent ferromagnetic layers $13_n$ and $13_{n+1}$ and a respective spacer layer 16 for increasing the RKKY-type coupling of the ferromagnetic layers across the spacer layer.

Referring to FIG. 3, shown therein, by way of illustration only, is a magnetic recording medium 30 according to the another embodiment of the invention, which medium 30 is analogous to medium 20 shown in FIG. 2, and includes four vertically stacked ferromagnetic layers 13, i.e., layers $13_1, 13_2, 13_3$, and $13_n$, wherein vertically adjacent ferromagnetic layers $13_n, 13_{n+1}$ are spaced-apart by substantially similarly constituted coupling/spacer layer structures 17, each comprised of a thin, non-magnetic spacer layer 16 providing anti-ferromagnetic coupling therebetween, and at least one thin, ferromagnetic interface layer $18_U$, $18_L$ at the respective upper and lower interfaces of the non-magnetic spacer layer 16 with the vertically adjacent ferromagnetic layers $13_n$ and $13_{n+1}$. Further by way of illustration only, each of the lower and upper, thin, ferromagnetic interface layers $18_L$, $18_U$ may comprise a ferromagnetic material having a saturation magnetization value $M_s$>600 emu/cc, e.g., an about 1 monolayer to an about 40 Å thick layer, preferably from about 2 to about 20 Å thick, of at least one of Co and Fe or their alloys with at least one of Pt, Cr, B, Ni, Ru, and Ta, wherein the concentration(s) of the at least one of Co and Fe in the alloy is (are) constant or varies across the thickness of the interface layers $18_L$ and/or $18_U$ from high near an interface with the non-magnetic spacer layer 16 to low near an interface with a ferromagnetic layer $13_n$. As before, each of the layers of the magnetic medium 30, including those of the coupling/spacer layer structure 17, may be deposited or otherwise formed by any suitable physical vapor deposition ("PVD") technique, e.g., sputtering, or by a combination of PVD techniques, i.e., sputtering, vacuum evaporation, etc.

According to the present invention, the recording density limit of longitudinal recording media is extended, not by increasing the anisotropy of the magnetic recording layer (which approach is limited by the writing field of the transducer head), but by stabilization of the medium via coupling of the recording layer with another ferromagnetic or anti-ferromagnetic layer, e.g., by anti-ferromagnetically coupling n vertically spaced-apart ferromagnetic layers across respective thin spacer layers, in order to increase the effective volume of each grain, hence increase their stability. According to the invention, the ferromagnetic layers forming the pairs of anti-ferromagnetically coupled ("AFC") layers satisfy the following conditions:

(1) the total exchange energy acting upon each of the plurality of vertically spaced-apart ferromagnetic layers of the layer stack in the remanent state and their effective magnetic energies are adjusted to provide opposing alignment of the magnetic moments of adjacent ferromagnetic layers of the stack; wherein: the magnetic energy of every second ferromagnetic layer, starting from the topmost ferromagnetic layer of the stack, is greater than or equal to the magnetic energy of the respective intermediate ferromagnetic layer or layers, or the magnetic energy of every second ferromagnetic layer, starting from the topmost ferromagnetic layer of the stack, is less than or equal to the magnetic energy of the respective intermediate ferromagnetic layer or layers, and the effective magnetic energy of a majority of the magnetic grains of every second ferromagnetic layer, starting from the topmost ferromagnetic layer of the stack, is greater than or equal to the effective magnetic energy of the magnetic grains of the respective intermediate ferromagnetic layers (An exception to this may exist in special instances where the head field is sufficiently strong as to write information in the bottommost ferromagnetic layer $13_1$). If necessary, the strength of the RKKY-type AFC between vertically adjacent ferromagnetic layers $13_n$ and $13_{n+1}$ can be increased by the addition of lower and/or upper thin ferromagnetic interface layers $18_L$ and/or $18_U$ between the non-magnetic spacer layers 16 and at least one of the respective ferromagnetic layers $13_n$ and $13_{n+1}$, as in the embodiment shown in FIG. 3;

(2) the above condition (1) need satisfy only one of the following two sub-conditions:

(a) the magnetic remanence-thickness product $M_r t$ of every other (i.e., every second) ferromagnetic layer, starting from the topmost ferromagnetic layer of the stack (i.e., layers $13_3$ and $13_1$ in the embodiments shown in FIGS. 2–3) must be larger than or equal to the $M_r t$ of the ferromagnetic layer(s) situated therebetween (e.g., layer $13_2$ in the embodiments shown in FIGS. 2–3). In this regard, and as stated above, when condition (1) is met, the structure comprises a stacked plurality of ferromagnetic layers with alternating directions of magnetic moment, i.e., the magnetic moment of every other (i.e., every second) layer is oriented in the same direction. This condition requires that every ferromagnetic layer having the same orientation of magnetic moment as the topmost ferromagnetic layer have a larger magnetic moment than the alternate ferromagnetic layers wherein the direction of magnetic moment is oriented in the opposite direction; or (b) the $M_r t$ of every other (i.e., every second) ferromagnetic layer, starting from the second from the topmost ferromagnetic layer (i.e., layers $13_3$ and $13_1$ in the embodiments shown in FIGS. 2–3), must be smaller than or equal to the $M_r t$ of the ferromagnetic layer(s) situated therebetween (e.g., ferromagnetic layer $13_2$ in the embodiment shown in FIGS. 2–3).

As a consequence of the above-described considerations/factors, the inventive structure and methodology provides AFC media wherein the thickness of the ferromagnetic layers is much less than the ferromagnetic layer thickness of conventional longitudinal recording media, while providing a total magnetic signal of equivalent magnitude. As a further consequence, the inventive media are expected to exhibit an increased SMNR without compromise of stability.

The present invention thus advantageously provides high quality, thermally stable, high areal recording density magnetic recording media, which media achieve improved thermal stability via enhanced magnetic coupling of a plurality of ferromagnetic recording layers with other ferromagnetic or anti-ferromagnetic recording layers. Moreover, the inventive methodology can be practiced in a cost-effective manner, utilizing conventional manufacturing technology and equipment (e.g., sputtering technology/equipment) for automated, large-scale manufacture of magnetic recording media, such as hard disks. Finally, the invention is not limited to use with hard disks, but rather is broadly applicable to the formation of thermally stable, high areal density magnetic recording media suitable for use in all manner of devices, products, and applications.

In the previous description, numerous specific details are set forth, such as specific materials, structures, processes, etc., in order to provide a better understanding of the present invention. However, the present invention can be practiced without resorting to the details specifically set forth herein. In other instances, well-known processing techniques and structures have not been described in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. An anti-ferromagnetically coupled ("AFC") magnetic recording medium, comprising:

(a) a non-magnetic substrate having at least one surface; and (b) a ferromagnetic recording layer comprising a layer stack overlying said at least one surface, said layer stack comprising a plurality of vertically spaced-apart ferromagnetic layers, said ferromagnetic layers being spaced-apart by respective non-magnetic spacer layers providing anti-ferromagnetic coupling (AFC) therebetween, the total exchange energy acting upon each of said ferromagnetic layers of said layer stack in the remanent state and their effective magnetic energies adjusted to provide opposing alignment of the magnetic moments of adjacent ferromagnetic layers of said stack, wherein:

(i) the magnetic energy of every second ferromagnetic layer, starting from the topmost ferromagnetic layer of said stack, is greater than the magnetic energy of the respective intermediate ferromagnetic layer or layers, or the magnetic energy of every second ferromagnetic layer, starting from the topmost ferromagnetic layer of said stack, is less than the magnetic energy of the respective intermediate ferromagnetic layer or layers;

(ii) the effective magnetic energy of a majority of the magnetic grains of every second ferromagnetic layer of said stack, starting from the topmost ferromagnetic layer of said stack, is greater than the effective magnetic energy of the magnetic grains of the respective intermediate ferromagnetic layer or layers; and (iii) the magnetic remanence-thickness product ("$M_r t$") of every second ferromagnetic layer, starting from the topmost ferromagnetic layer of said stack, is greater than the $M_r t$ of the respective intermediate ferromagnetic layer or layers, or the $M_r t$ of every second ferromagnetic layer, starting from the second from the topmost ferromagnetic layer of said stack, is less than the $M_r t$ of the respective intermediate ferromagnetic layer or layers.

2. The magnetic recording medium as in claim 1, wherein:
said layer stack comprises n spaced-apart ferromagnetic layers, where n is an even or odd integer ranging from about 2 to about 30.

3. The magnetic recording medium as in claim 1, wherein:
each of said ferromagnetic layers is from about 4 Å, or about 2 monolayers, to about 200 Å thick and comprises a single ferromagnetic layer or a plurality of ferromagnetic sub-layers.

4. The magnetic recording medium as in claim 3, wherein:
said single ferromagnetic layer and each of said plurality of ferromagnetic sub-layers comprises at least one ferromagnetic alloy.

5. The magnetic recording medium as in claim 4, wherein:
said single ferromagnetic layer and each of said plurality of ferromagnetic sub-layers comprises at least one Co-based alloy.

6. The magnetic recording medium as in claim 5, wherein said at least one Co-based alloy is selected from alloys of Co with at least one element from the group consisting of Pt, Cr, B, Fe, Ta, Ni, Mo, V, Nb, W, Ru, and Ge.

7. The magnetic recording medium as in claim 1, wherein:
each of said non-magnetic spacer layers is from about 2 to about 20 Å thick.

8. The magnetic recording medium as in claim 7, wherein:
each of said non-magnetic spacer layers comprises a material selected from the group consisting of Ru, Rh, Ir, Cr, Cu, and their alloys.

9. The magnetic recording medium as in claim 1, further comprising:
a ferromagnetic interface layer at at least one interface between each said non-magnetic spacer layer and respective ones of said ferromagnetic layers for increasing RKKY-type coupling of said spaced-apart ferromagnetic layers across said non-magnetic spacer layer.

10. The magnetic recording medium as in claim 9, wherein:
each of said ferromagnetic interface layers comprises an about 1 monolayer thick to an about 40 Å thick layer of a ferromagnetic material having a saturation magnetization value $M_s > 600$ emu/cc.

11. The magnetic recording medium as in claim 10, wherein:
each of said ferromagnetic interface layers comprises a layer of at least one of Co and Fe or their alloys with at least one of Pt, Cr, B, Ni, Ru, and Ta, wherein the concentration(s) of the at least one of Co and Fe in the alloy is (are) constant or varies across the thickness of the interface layer(s) from high near an interface with the non-magnetic spacer layer to low near an interface with a respective ferromagnetic layer.

12. The magnetic recording medium as in claim 1, further comprising:
(c) seed and underlayers between said at least one surface of said non-magnetic substrate and said layer stack for controlling the crystallographic texture of said ferromagnetic layers; and
(d) protective overcoat and lubricant topcoat layers provided on an upper surface of said layer stack.

13. The magnetic recording medium as in claim 12, wherein:
said seed layer is from about 10 to about 1000 Å thick and comprises a material selected from the group consisting of Ni—Al, Fe—Al, Cr—Ti, Cr—Ta, Ta, Ta—W, Ru—Al, Co—Ti, and TaN; and
said underlayer is from about 10 to about 300 Å thick and comprises a polycrystalline layer of Cr or a Cr-based alloy.

14. A method of forming a magnetic recording medium, comprising steps of:
(a) providing a non-magnetic substrate having at least one surface adapted for layer formation thereover; and
(b) forming a ferromagnetic recording layer comprising a layer stack overlying said at least one surface, said layer stack comprising a plurality of vertically spaced-apart ferromagnetic layers, said ferromagnetic layers being spaced-apart by respective non-magnetic spacer layers providing anti-ferromagnetic coupling ("AFC") therebetween, the total exchange energy acting upon each of said ferromagnetic layers of said layer stack in the remanent state and their effective magnetic energies being adjusted to provide opposing alignment of the magnetic moments of adjacent ferromagnetic layers of said stack, wherein:
(i) the magnetic energy of every second ferromagnetic layer, starting from the topmost ferromagnetic layer of said stack, is greater than the magnetic energy of the respective intermediate ferromagnetic layer or layers, or the magnetic energy of every second ferromagnetic layer, starting from the topmost ferromagnetic layer of said stack, is less than the magnetic energy of the respective intermediate ferromagnetic layer or layers;
(ii) the effective magnetic energy of a majority of the magnetic grains of every second ferromagnetic layer of said stack, starting from the topmost ferromagnetic layer of said stack, is greater than the effective magnetic energy of the magnetic grains of the respective intermediate ferromagnetic layer or layers; and
(iii) the magnetic remanence-thickness product ("$M_r t$") of every second ferromagnetic layer, starting from the topmost ferromagnetic layer of said stack, is greater than the $M_r t$ of the respective intermediate ferromagnetic layer or layers, or the $M_r t$ of every second ferromagnetic layer, starting from the second from the topmost ferromagnetic layer of said stack, is less than the $M_r t$ of the respective intermediate ferromagnetic layer or layers.

15. The method according to claim 14, wherein:

step (b) comprises forming said layer stack as including n spaced-apart ferromagnetic layers, where n is an even or odd integer ranging from 2 to about 30.

16. The method according to claim 14, wherein:

step (b) comprises forming said layer stack such that each of said ferromagnetic layers comprises at least one ferromagnetic alloy, is from about 4 Å, or about 2 monolayers, to about 200 Å thick, and comprises a single ferromagnetic layer or a plurality of ferromagnetic sublayers, said at least one ferromagnetic alloy being selected from alloys of Co with at least one element from the group consisting of Pt, Cr, B, Fe, Ta, Ni, Mo, V, Nb, W, Ru, and Ge.

17. The method according to claim 14, wherein:

step (b) comprises forming said layer stack such that each of said non-magnetic spacer layers is from about 2 to about 20 Å thick and comprises a material selected from the group consisting of Ru, Rh, Ir, Cr, Cu, and their alloys.

18. The method according to claim 14, wherein:

step (b) comprises forming said layer stack such that a ferromagnetic interface layer is present at at least one interface between each said non-magnetic spacer layer and respective ones of said ferromagnetic layers for increasing RKKY-type coupling of said ferromagnetic layers across said non-magnetic spacer layer, each of said ferromagnetic interface layers comprising an about 1 monolayer thick to an about 40 Å thick layer of a ferromagnetic material having a saturation magnetization value $M_s > 600$ emu/cc, said ferromagnetic material being comprised of at least one of Co and Fe or their alloys with at least one of Pt, Cr, B, Ni, Ru, and Ta, wherein the concentration(s) of the at least one of Co and Fe in the alloy is (are) constant or varies across the thickness of the interface layers from high near an interface with the non-magnetic spacer layer to low near an interface with a ferromagnetic layer.

19. The method according to claim 14, further comprising steps of:

(c) providing seed and underlayers between said at least one surface of said non-magnetic substrate and said layer stack for controlling the crystallographic texture of said ferromagnetic layers, said seed layer being from about 10 to about 1000 Å thick and comprising a material selected from the group consisting of Ni—Al, Fe—Al, Cr—Ti, Cr—Ta, Ta, Ta—W, Ru—Al, Co—Ti, and TaN; and said underlayer being from about 10 to about 300 Å thick and comprising a polycrystalline layer of Cr or a Cr-based alloy; and (d) forming protective overcoat and lubricant topcoat layers on an upper surface of said layer stack.

* * * * *